(12) United States Patent
Sonoda et al.

(10) Patent No.: US 7,040,596 B2
(45) Date of Patent: May 9, 2006

(54) SOLENOID VALVE FOR FUEL CELL

(75) Inventors: Kouji Sonoda, Kakuda (JP); Masakazu Murai, Kakuda (JP); Kouetsu Hikichi, Kakuda (JP); Hideki Sasaki, Kakuda (JP); Yoshio Saito, Iwanuma (JP); Koji Katano, Toyko (JP); Kazunori Fukuma, Kawachi-gun (JP); Hiroyasu Ozaki, Shioya-gun (JP); Kouji Miyano, Wako (JP); Katsumi Sahoda, Wako (JP)

(73) Assignee: Keihin Corporation, Tokyo (JP)

( * ) Notice: Subject to any disclaimer, the term of this patent is extended or adjusted under 35 U.S.C. 154(b) by 25 days.

(21) Appl. No.: 10/726,206

(22) Filed: Dec. 1, 2003

(65) Prior Publication Data

US 2004/0232373 A1    Nov. 25, 2004

(30) Foreign Application Priority Data

Nov. 29, 2002  (JP) ............................. 2002-347156
Mar. 7, 2003   (JP) ............................. 2003-062444

(51) Int. Cl.
  *F16K 31/02*  (2006.01)
(52) U.S. Cl. ............................. 251/129.15; 251/129.17
(58) Field of Classification Search ........... 251/129.15, 251/129.16, 129.17, 129.19, 129.2
  See application file for complete search history.

(56) References Cited

U.S. PATENT DOCUMENTS 3,424,429 A * 1/1969 Monnich ................ 251/129.17
5,546,987 A * 8/1996 Sule ........................ 137/625.5
2005/0118475 A1 * 6/2005 Ueda et al. .................... 429/26

FOREIGN PATENT DOCUMENTS

JP      2002-093438      3/2002
JP      2002-347156     12/2002

* cited by examiner

*Primary Examiner*—Justine R. Yu
*Assistant Examiner*—Peter deVore
(74) *Attorney, Agent, or Firm*—Lahive & Cockfield, LLP; Anthony A. Laurnetano, Esq.

(57) ABSTRACT

A diaphragm is clamped between a solenoid unit disposed in a casing and a second valve body in which hydrogen is introduced. A filter comprising a bottomed cylindrical mesh member is mounted in a first passage defined in the first valve body. A restriction having an orifice for restricting the flow rate of hydrogen supplied to first and second communication chambers is mounted in a first port that is disposed upstream of the filter. The restriction and the filter are disposed coaxially in line with each other.

18 Claims, 13 Drawing Sheets

SOLENOID VALVE FOR FUEL CELL

BACKGROUND OF THE INVENTION

1. Field of the Invention

The present invention relates to a solenoid valve for discharging a reaction gas from fuel cells of a fuel cell system.

2. Description of the Related Art

Heretofore, solid polymer membrane fuel cell devices have a stack of cells (hereinafter referred to as a fuel cell stack) each comprising an anode, a cathode, and a solid polymer electrolyte membrane interposed between the anode and the cathode. When hydrogen is supplied as a fuel to the anode and air is supplied as an oxidizing agent to the cathode. Hydrogen ions are generated at the anode by a catalytic reaction, and move through the solid polymer electrolyte membrane to the cathode. Electric power is generated in the fuel cell stack by the electrochemical reaction.

The fuel cell devices are combined with an air compressor for supplying air as a reactant gas to the cathodes and a pressure control valve for supplying hydrogen as a reactant gas to the anodes. The pressure of the reactant gas supplied to the anodes with respect to the pressure of the reactant gas supplied to the cathodes is adjusted to a predetermined pressure for thereby achieving a predetermined power generation efficiency, and the flow rate of the reactant gas supplied to the fuel cell stack are controlled to obtain a desired fuel cell output.

The applicant of the present application has proposed a solenoid valve which can stably and smoothly be opened and closed at low temperatures for appropriately discharging a reactant gas from fuel cell devices (Japanese patent application No. 2002-347156).

One known prior invention relevant to the present invention is concerned with a fuel cell system having a check valve that is inserted in a hydrogen return line thereof and selectively openable and closable by a controller for preventing excessive hydrogen from being recirculated and also preventing fresh hydrogen from being discharged out of the fuel cell system while hydrogen is being purged, thereby to reliably purge hydrogen and prevent fresh hydrogen from being wasted (see, for example, Japanese laid-open patent publication No. 2002-93438).

SUMMARY OF THE INVENTION

It is a general object of the present invention to provide a solenoid valve which can stably and smoothly be opened and closed at low temperatures for discharging a reactant gas from fuel cells.

A major object of the present invention is to provide a solenoid valve for fuel cells which is capable of reducing a pressure applied to a diaphragm disposed within a valve housing thereby to increase the durability of the diaphragm.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
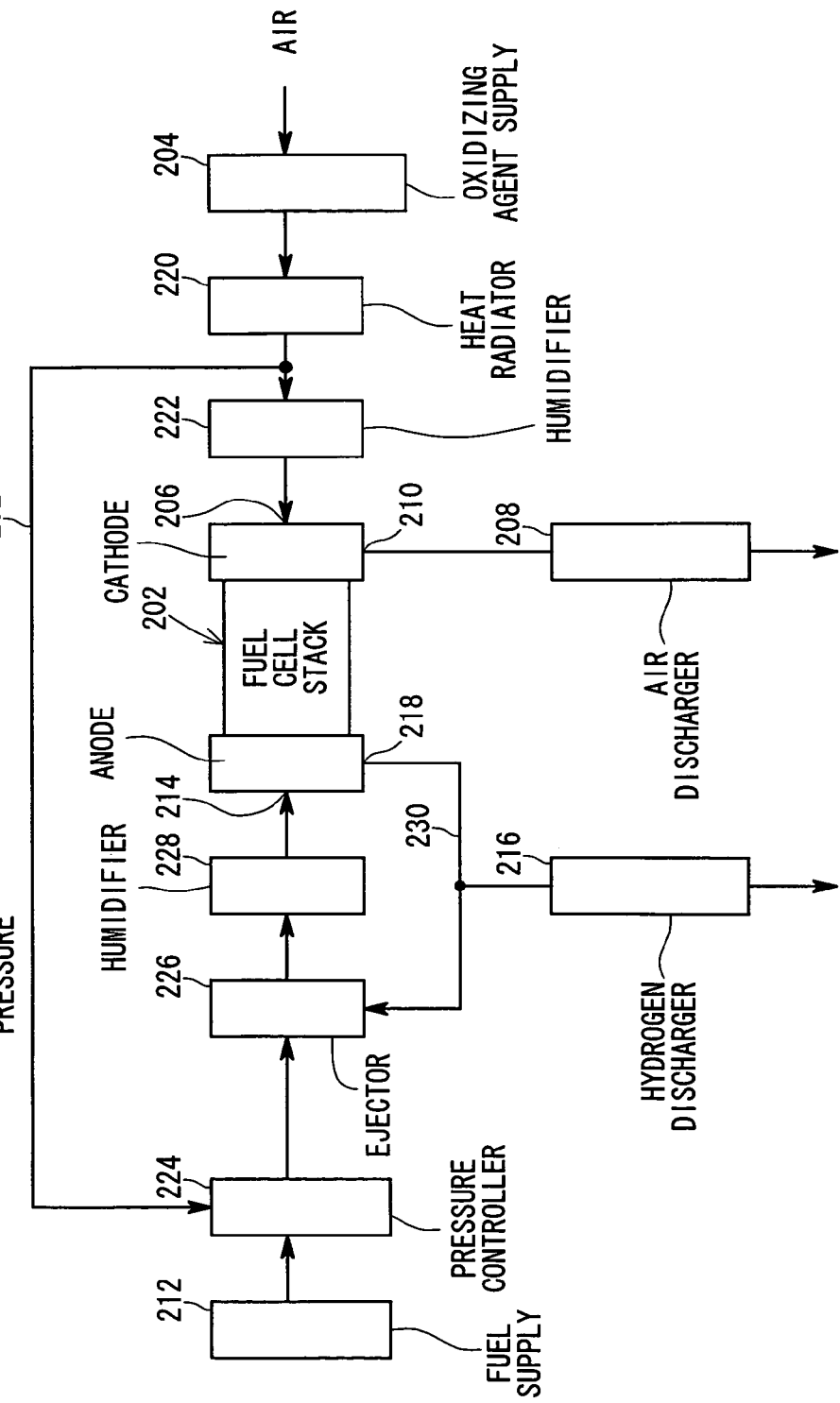
FIG. 1 is a block diagram of a fuel cell system which incorporates a solenoid valve for fuel cells according to a first embodiment of the present invention.

FIG. 1 is a block diagram of a fuel cell system 200 which incorporates a solenoid valve 10, 300 for fuel cells according to a first embodiment of the present invention. The fuel cell system 200 is mounted on a vehicle such as an automobile or the like. First, an arrangement of the fuel cell system 200 will be described below.

As shown in FIG. 1, the fuel cell system 200 includes a fuel cell stack 202 having a stack of cells each comprising an anode, a cathode, and a solid polymer electrolyte membrane such as a solid polymer ion exchange membrane interposed between the anode and the cathode.

The fuel cell stack 202 has an anode supplied with hydrogen as a fuel is supplied to the anode of the fuel cell stack 202, and air including oxygen, for example, as an oxidizing agent is supplied to the cathode of the fuel cell stack 202. A reactant gas used in first and second embodiments collectively refers to hydrogen and air or hydrogen and excessive hydrogen in air.

Air is supplied from an oxidizing agent supply 204 to the cathode through an air supply port 206. An air discharge port 210 is connected to an air discharger 208 for discharging air in the cathode. Hydrogen is supplied from a fuel supply 212 to the anode through a hydrogen supply port 214. A hydrogen discharge port is 218 connected to a hydrogen discharger 216.

The fuel cell stack 202 is arranged such that hydrogen ions generated at the anode by a catalytic reaction move through the solid polymer electrolyte membrane to the cathode, and react with oxygen. Electric power is generated in the electrochemical reaction.

To the air supply port 206, there are connected the oxidizing agent supply 204, a heat radiator 220, and a cathode humidifier 222 by an air supply passage. The air discharger 208 is connected to the air discharge port 210 by an air discharge passage.

To the hydrogen supply port 214, there are connected the fuel supply 212, a pressure controller 224, an ejector 226, and an anode humidifier 228 by a hydrogen supply passage. The hydrogen discharger 216 is connected to the hydrogen discharge port 218 by a circulation passage 230.

The oxidizing agent supply 204 comprises, for example, an air compressor and a motor for actuating the air compressor (not shown). The oxidizing agent supply 204 adiabatically compresses air, which is to be used as an oxidizing gas in the fuel cell stack 202, and supplies the compressed air to the fuel cell stack 202.

The air supplied from the oxidizing agent supply 204 is set to a certain pressure depending on the load on the fuel cell stack 202 or the amount of depression of an accelerator pedal (not shown), for example, before it is introduced into the fuel cell stack 202. After the air is cooled by the heat radiator 220, to be described below, it is supplied as a pilot pressure through a bypass passage 232 to the pressure controller 224.

The heat radiator 220 comprises an intercooler or the like (not shown), for example, and cools the air supplied from the oxidizing agent supply 204 during normal operation of the fuel cell stack 202 through a heat exchange with cooling water which flows through a flow passage. Therefore, the supplied air is cooled to a predetermined temperature and then introduced into the cathode humidifier 222.

The cathode humidifier 222 has a water-permeable membrane, for example. The cathode humidifier 222 humidifies the air, which has been cooled to the predetermined temperature by the heat radiator 220, to a certain humidity by passing water from one side of the water-permeable membrane to the other, and supplies the humidified air to the air supply port 206 of the fuel cell stack 202. The humidified air is supplied to the fuel cell stack 202 to keep the ion conductivity of the solid polymer electrolyte membranes of the fuel cell stack 202 in a predetermined state.

The air discharger 208 connected to the air discharge port 210 of the fuel cell stack 202 has a discharge valve (not shown) which discharges the air into the atmosphere.

The fuel supply 212 comprises a hydrogen gas container (not shown) for supplying hydrogen as a fuel to the fuel cells, for example. The fuel supply 212 stores hydrogen that is to be supplied to the anode of the fuel cell stack 202.

The pressure controller 224 comprises a pneumatic proportional pressure control valve, for example, and sets a secondary pressure that is the pressure from the outlet of the pressure controller 224 to a pressure within a predetermined range, using the pressure of the air supplied through the bypass passage 232 as a pilot pressure.

The ejector 226 comprises a nozzle and a diffuser (not shown). The fuel (hydrogen) supplied from the pressure controller 224 is accelerated when it passes through the nozzle, and ejected toward the diffuser. When the fuel flows at a high speed from the nozzle to the diffuser, a negative pressure is developed in an auxiliary chamber disposed between the nozzle and the diffuser, attracting the fuel discharged from the anode through the circulation passage 230. The fuel and the discharged fuel that are mixed together by the ejector 226 are supplied to the anode humidifier 228. The fuel discharged from the fuel cell stack 202 circulates through the ejector 226.

Therefore, the unreacted gas discharged from the hydrogen discharge port 218 of the fuel cell stack 202 is introduced through the hydrogen passage 230 into the ejector 226. The hydrogen supplied from the pressure controller 224 and the gas discharged from the fuel cell stack 202 are mixed with each other and supplied to the fuel cell stack 202.

The anode humidifier 228 has a water-permeable membrane, for example. The anode humidifier 228 humidifies the fuel, which has been delivered from the ejector 226, to a certain humidity by passing water from one side of the water-permeable membrane to the other, and supplies the humidified fuel to the hydrogen supply port 214 of the fuel cell stack 202. The humidified hydrogen is supplied to the fuel cell stack 202 to keep the ion conductivity of the solid polymer electrolyte membranes of the fuel cell stack 202 in a predetermined state.

The hydrogen discharger 216 which is connected to the hydrogen discharge port 218 of the fuel cell stack 202 by the circulation passage 230 discharges excessive hydrogen from the fuel cell stack 202 out of the fuel cell system 200. The hydrogen discharger 216 has a solenoid valve 10 which can be opened and closed depending on an operating state of the fuel cell stack 202 for discharging hydrogen from the fuel cell stack 202 out of the fuel cell system 200. The solenoid valve 10 discharges the reactant gas.

The solenoid valve 10 according to a first embodiment of the present invention, which is incorporated in the fuel cell system 200 will be described in detail below with reference to the drawings.

Figure 3:
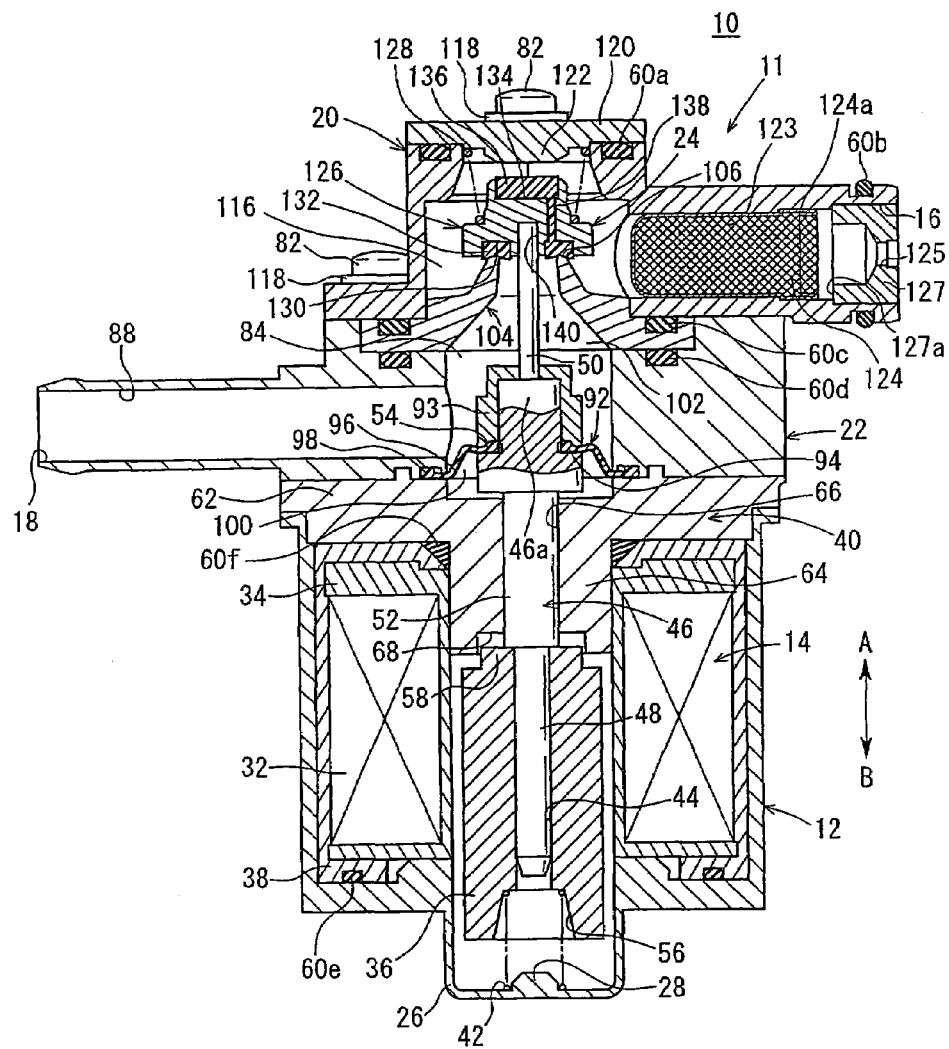
FIG. 3 is a vertical cross-sectional view taken alone line III—III of FIG. 2.
Figure 4:
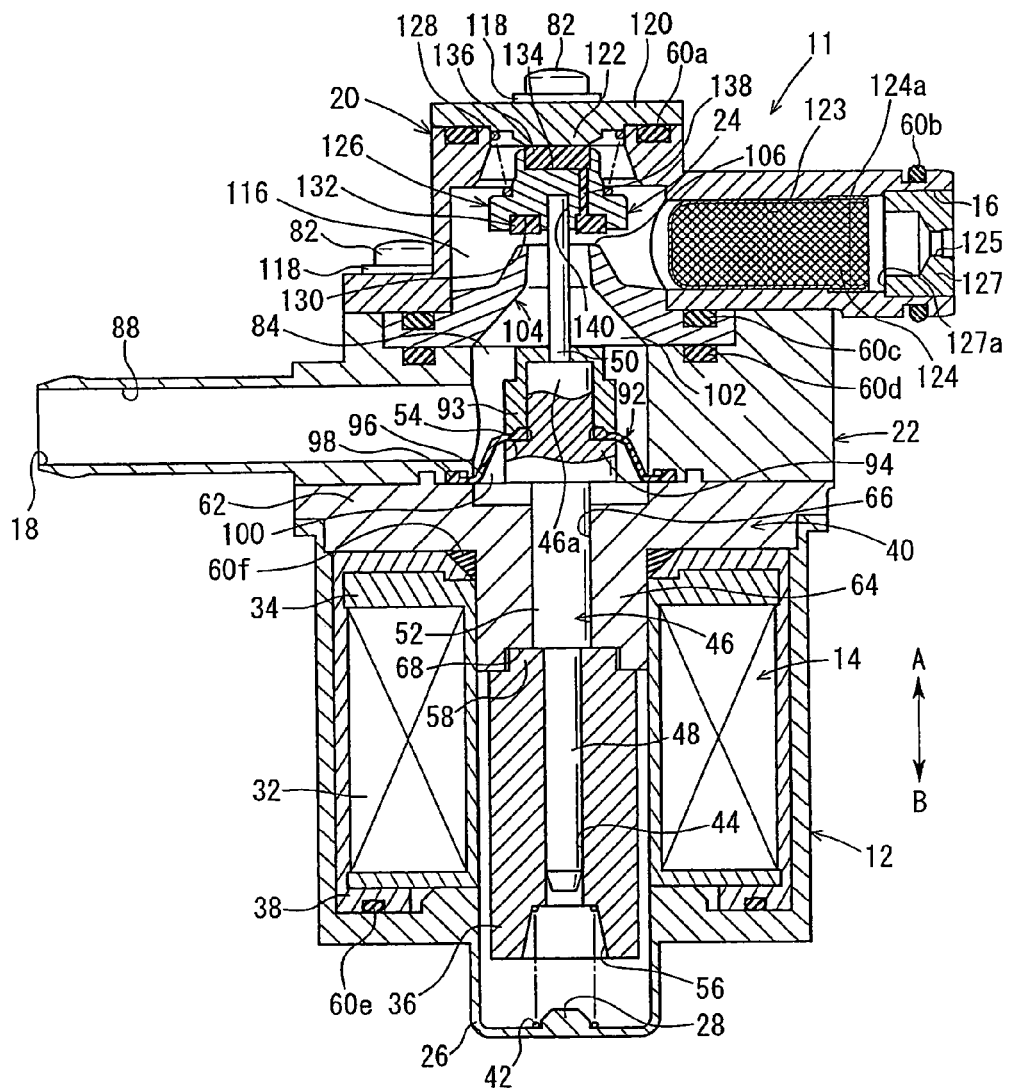
FIG. 4 is a vertical cross-sectional view of the solenoid valve shown in FIG. 3 when it is opened.
Figure 5:
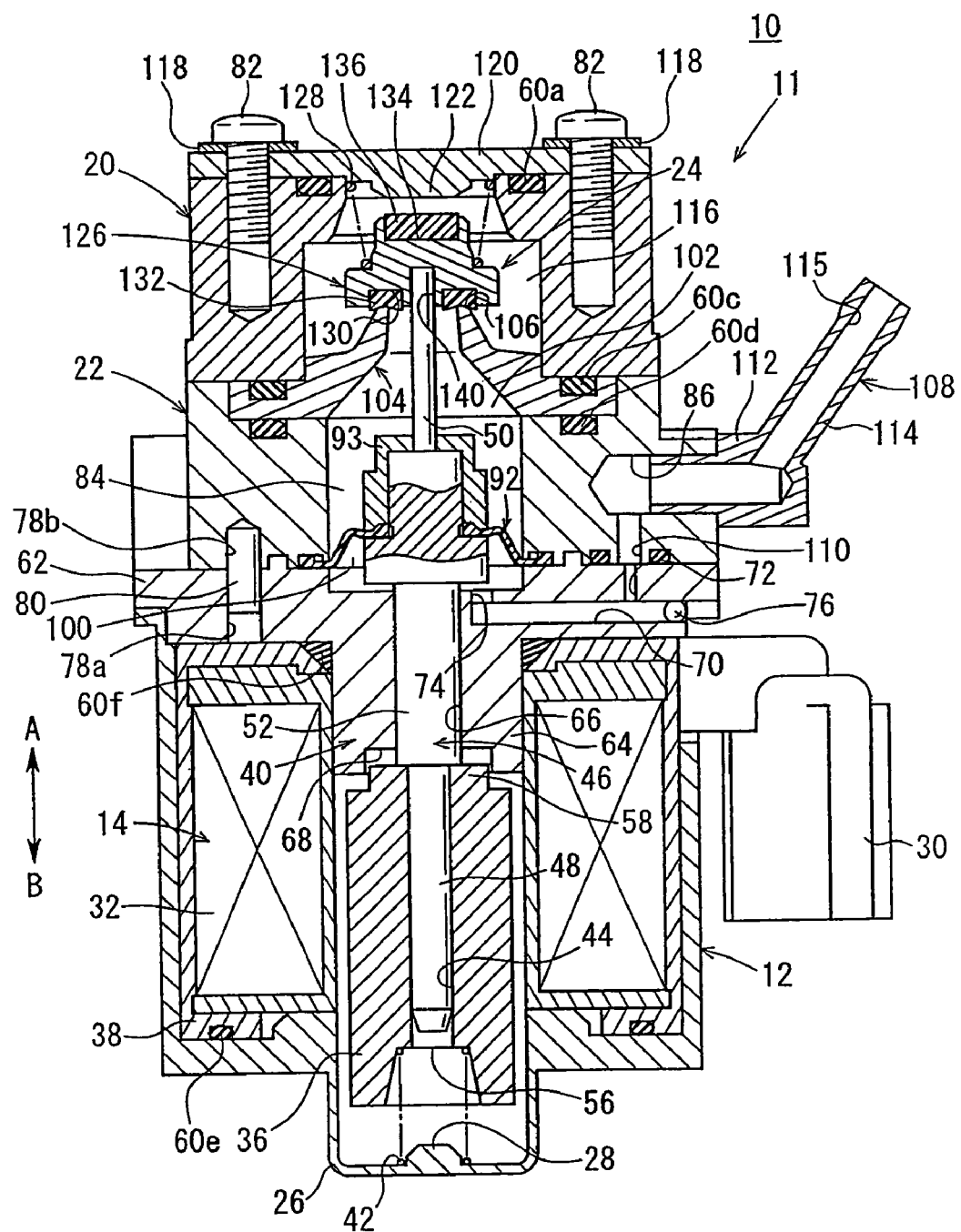
FIG. 5 is a vertical cross-sectional view taken alone line V—V of FIG. 2.

As shown in FIGS. 3 through 5, the solenoid valve 10 includes a valve housing 11 having a first port 16 for introducing hydrogen (reactant gas) and a second port 18 for discharging the hydrogen. The solenoid valve 10 also has a casing 12 formed of a thin sheet of metallic material and integrally joined to a lower portion of the valve housing 11, a solenoid unit 14 disposed in the casing 12, and a valve mechanism 24 for switching the first and second ports 16, 18 into and out of communication with each other in response to energization of the solenoid unit 14.

The valve housing 11 is integrally joined to an upper portion of the casing 12. The valve housing 11 comprises a first valve body 20 which has the first port 16 for introducing hydrogen and a second valve body 22 which has the second port 18 for discharging the hydrogen that is introduced into the valve housing 11 from the first port 16.

The first valve body 20 has a first communication chamber 116 defined substantially centrally therein for introducing hydrogen therein. The first port 16 is defined in a side wall of the first valve body 20 for introducing hydrogen into the first communication chamber 116.

A lid 120 is mounted on an upper end of the first valve body 20 by a screw 82 and a washer 118, closing an upper portion of the first valve body 20. The first communication chamber 116 is hermetically sealed by a seal member 60a mounted on an upper surface of the first valve body 20.

The lid 120 has a stopper 122 projecting downwardly. When a valve head 126, to be described later, is displaced toward the lid 120 (in the direction indicated by the arrow A), the stopper 122 abuts against an end face of the valve head 126 to limit the displacement of the valve head 126.

As shown in FIG. 3, a filter 124 comprising a bottomed cylindrical mesh member is mounted in a first passage 123. A restriction 127 having an orifice 125 for restricting the flow rate of hydrogen supplied to the first communication chamber 116 is mounted in the first port 16 that is disposed upstream of the filter 124. The restriction 127 and the filter 124 are disposed coaxially in line with each other (see FIG.

6). The filter 124 has a mesh size or opening diameter of 100 µm or less, preferably 80 µm or less.

Since the restriction 127 with the orifice 125 is disposed in the first port 16, the flow rate of hydrogen flowing from the first port 16 toward the second port 18 is limited, reducing a load imposed on a diaphragm 92 that is disposed in a second communication chamber 84. Stated otherwise, the fluid (hydrogen) under pressure flowing through the second communication chamber 84 is depressurized, preventing the diaphragm 92 from being deformed beyond an allowable range for increased durability thereof.

The filter 124 is press-fitted in and along the inner circumferential surface of a tube which defines the first passage 123 therein. The filter 124 has an enlarged end 124a held in abutment against a first annular step 129a on the inner circumferential surface of the tube, so that the filter 124 is positioned and locked in the first passage 123. Therefore, the filter 124 is prevented from being further displaced inwardly in the first passage 123. The filter 124 mounted in the first passage 123 prevents dust or the like from entering the first communication chamber 116.

When dust or the like enters the solenoid valve 10 from the first port 16, the filter 124 prevents the introduced dust or the like from being attached to an abutment surface of the valve head 126 (to be described later) disposed in the first communication chamber 116 or a seating surface 106 of a valve seat, to be described later. Consequently, the hermetic sealing capability that is achieved when the valve head 126 is seated on the seating surface 106 is prevented from being lowered by dust or the like.

Since dust or the like is prevented from entering the first communication chamber 116, a shaft 46 is protected against a smooth movement failure which would otherwise be caused by the introduction of dust or the like into a sliding region of the shaft 46. In addition, dust or the like is prevented from flowing from the second port 18 of the solenoid valve 10 through a tube, not shown, into a downstream region in the fuel cell system 200.

Figure 6:
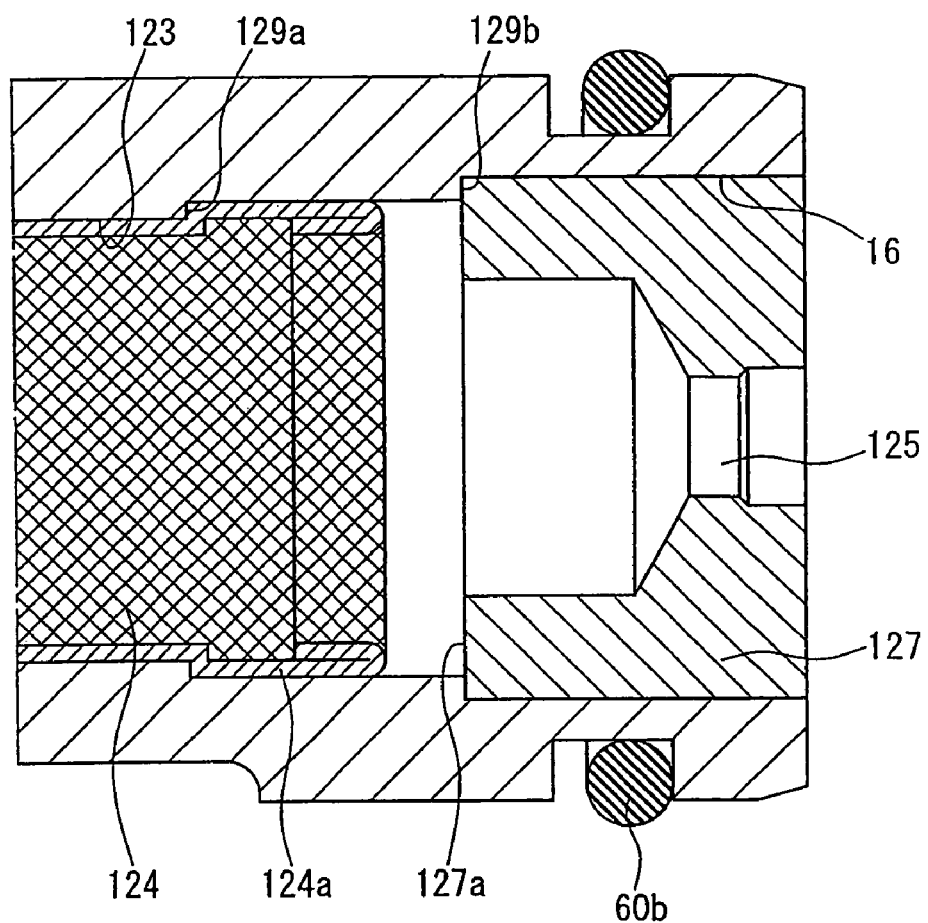
FIG. 6 is an enlarged vertical cross-sectional view, partly cut away, of a restriction mounted in a first port shown in FIG. 3.

The restriction 127 is press-fitted in and along the inner circumferential surface of a tube which defines the first port 16 therein. The restriction 127 has an end 127a held in abutment against a second annular step 129b on the inner circumferential surface of the tube, so that the restriction 127 is positioned and locked in the first port 16 (see FIG. 6).

Since the restriction 127 with the orifice 125 is disposed upstream of the filter 124, excessive humidifying water is prevented from being introduced into the filter 124, thereby reducing the possibility of clogging of the filter 124.

A seal member 60b is mounted in an annular groove defined in the outer circumferential surface of the first port 16. When a tube, not shown, is mounted on the first port 16, the seal member 60b is sandwiched between the inner circumferential surface of the tube and the outer circumferential surface of the first port 16, providing a hermetic seal for the hydrogen that flows through the tube.

As shown in FIGS. 3 and 4, the second valve body 22 is integrally fastened to a lower portion of the first valve body 20 by a screw 82 and a washer 118.

As shown in FIGS. 3 through 5, the second valve body 22 has the second communication chamber 84 for introducing hydrogen therein and the second port 18 for discharging the hydrogen that has been introduced into the second communication chamber 84. An air bleeder port 86 (see FIG. 5) is defined in a side surface of the second valve body 22 substantially perpendicularly to the second port 18 for discharging the fluid from within the diaphragm 92 (to be described later).

The second port 18 is defined so as to project radially outwardly from a side surface of the second valve body 22, and communicates with the second communication chamber 84 through a second passage 88 defined in the second port 18.

The diaphragm 92 disposed in the second communication chamber 84 is clamped between the second valve body 22 and a shaft guide (fixed core) 40 (to be described later) of the solenoid unit 14. The diaphragm 92 is of an integral double-layer structure which comprises, for example, a high-strength base fabric covered with a thin elastomeric layer of nitrile rubber (NBR), and hence has high durability. As a result, the diaphragm 92 is highly durable because of its structure as well as the reduction in the pressure of the fluid introduced into the second communication chamber 84 through the restriction 127.

Figure 7:
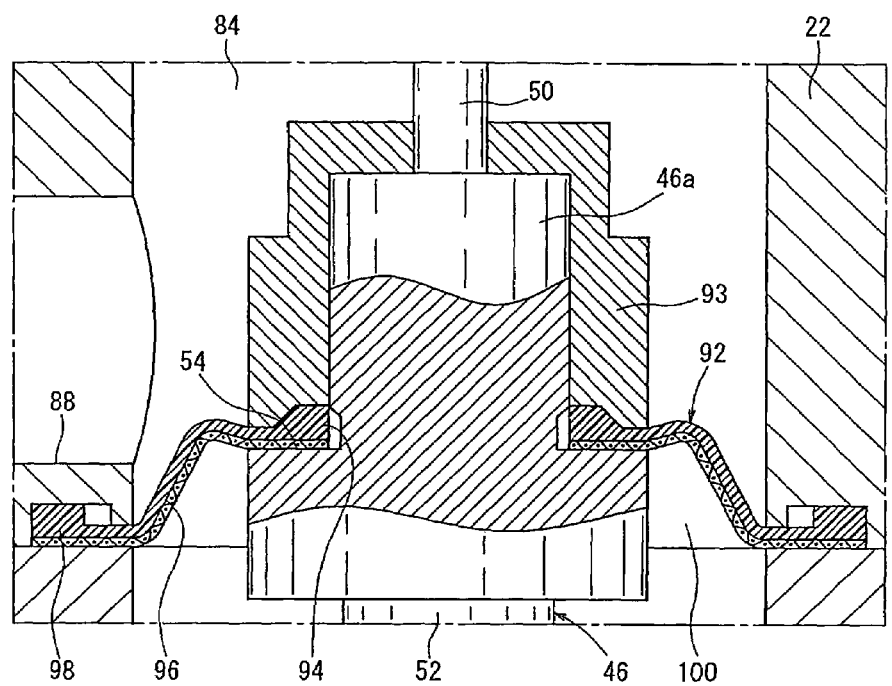
FIG. 7 is an enlarged vertical cross-sectional view, partly cut away, of a diaphragm and a shaft shown in FIG. 3.

The diaphragm 92 comprises a clamped portion 94 that is clamped between a step 54 of the shaft 46 (to be described later) and a press-fitted fixture 93 mounted on the shaft 46, a bent portion 96 flexibly extending radially outwardly from the clamped portion 94, and a peripheral edge portion 98 formed on an outer peripheral edge of the bent portion 96 (see FIG. 7). The press-fitted fixture 93 is press-fitted over an enlarged end 46a of the shaft 46.

Because the diaphragm 92 is clamped between the step 54 of the shaft 46 and the press-fitted fixture 93 that is press-fitted over the enlarged end 46a of the shaft 46, the diaphragm 92 provides a sealing function to keep the second communication chamber 84 hermetically sealed appropriately for preventing the reactant gas from leaking into the solenoid unit 14.

Since humidified hydrogen introduced from the fuel cell stack 202 (see FIG. 1) into the solenoid valve 10 contains water, water tends to enter the second communication chamber 84. However, as the diaphragm 92 prevents such water from going into the solenoid unit 14, no water is frozen between the shaft guide 40 and the shaft 46 at low temperatures such as in a cold climate. The shaft 46 is thus allowed to move smoothly because no water is frozen between the shaft guide 40 and the shaft 46.

Furthermore, since water in the second communication chamber 84 is reliably prevented by the diaphragm 92 from entering the solenoid unit 14, a movable core 36 which is made of a magnetic metallic material and the shaft 46 which is made of a nonmagnetic metallic material are prevented from developing rust, but have better durability.

When worn-off particles are produced by sliding motion of the shaft 46 through an insertion hole 66 defined in the shaft guide 40, dust particles such as worn-off particles are prevented by the diaphragm 92 from entering the second communication chamber 84. As a result, dust particles such as worn-off particles do not flow from the second communication chamber 84 through the second port 18 into a downstream region in the fuel cell system 200 (see FIG. 1).

A space 100 defined between the bent portion 96 of the diaphragm 92 and an upper surface of a flange 62 is held in communication with a fluid passage 70 through a second communication passage (fluid passage) 74 (see FIG. 5).

A valve seat 104 is mounted in an annular recess 102 that is defined in the upper portion of the second valve body 22, and has a peripheral edge sandwiched between the second valve body 22 and a lower surface of the first valve body 20. The interior of the first valve body 20 is hermetically sealed by a seal member 60c that is mounted on an upper surface of the valve seat 104.

The valve seat 104 is progressively smaller in diameter in the upward direction and has on its upper end face the seating surface 106 which lies substantially horizontally for the valve head 126 to be seated thereon.

A seal member 60d is mounted in an annular groove defined in the bottom of the annular recess 102 that is defined in the second valve body 22. The valve seat 104 has its lower surface held against the seal member 60d, hermetically sealing the interior of the second communication chamber 84 which communicates with the interior of the valve seat 104.

Figure 8:
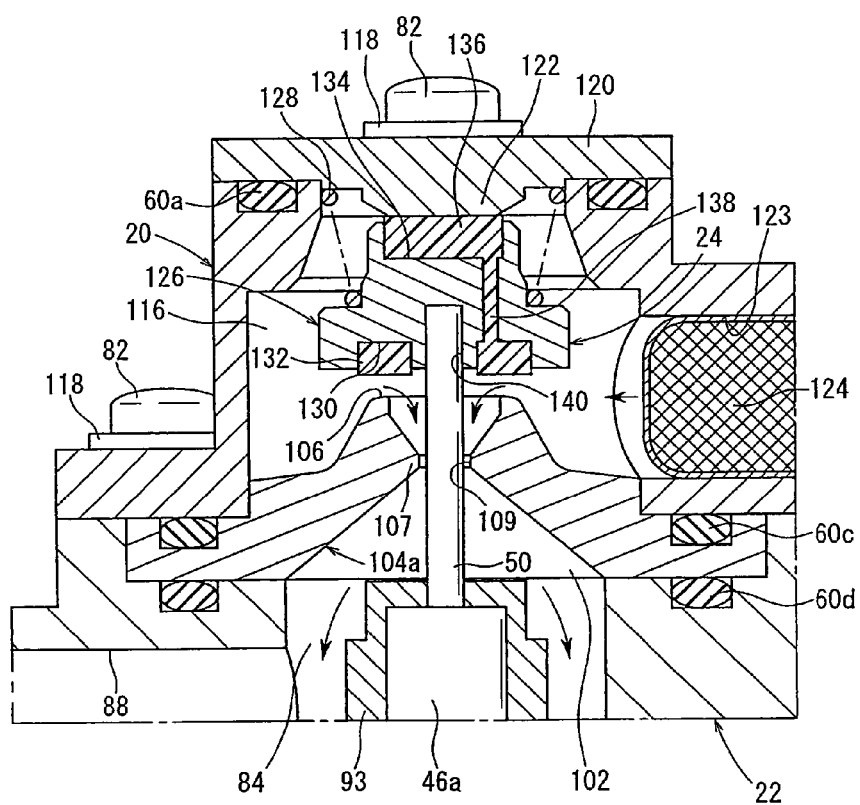
FIG. 8 is an enlarged vertical cross-sectional view showing a restriction disposed in a valve seat of the solenoid valve shown in FIG. 4.

As shown in FIG. 8, a valve seat 104a having a tapered annular ridge 107 which is progressively smaller in diameter toward a second shank 50 of the shaft 46 may be disposed above the second valve body 22, instead of the restriction 127 (see FIG. 3) for limiting the flow rate of hydrogen that flows from the first port 16 (see FIG. 3) into the first communication chamber 116.

When the valve head 126 is unseated from the seating surface 106, the valve seat 104a provides communication between the first communication chamber 116 and the second communication chamber 84 through an orifice 109 provided by the annular ridge 107.

When hydrogen flows from the first port 16 toward the second port 18, the flow rate of the hydrogen is limited by the orifice 109 provided by the annular ridge 107 of the valve seat 104a. Therefore, the load imposed on the diaphragm 92 disposed in the second communication chamber 84 can be reduced. Consequently, the orifice 109 provided by the annular ridge 107 of the valve seat 104a, rather than the restriction 127 (see FIG. 3) disposed in the first port 16, is capable of appropriately reducing the flow rate of the fluid under pressure (hydrogen) flowing through the second communication chamber 84, thus increasing the durability of the diaphragm 92.

As the annular ridge 107 is integrally formed with the valve seat 104a, the number of man-hours required to assemble the same can be reduced, and the number of parts used can also be reduced.

Figure 9:
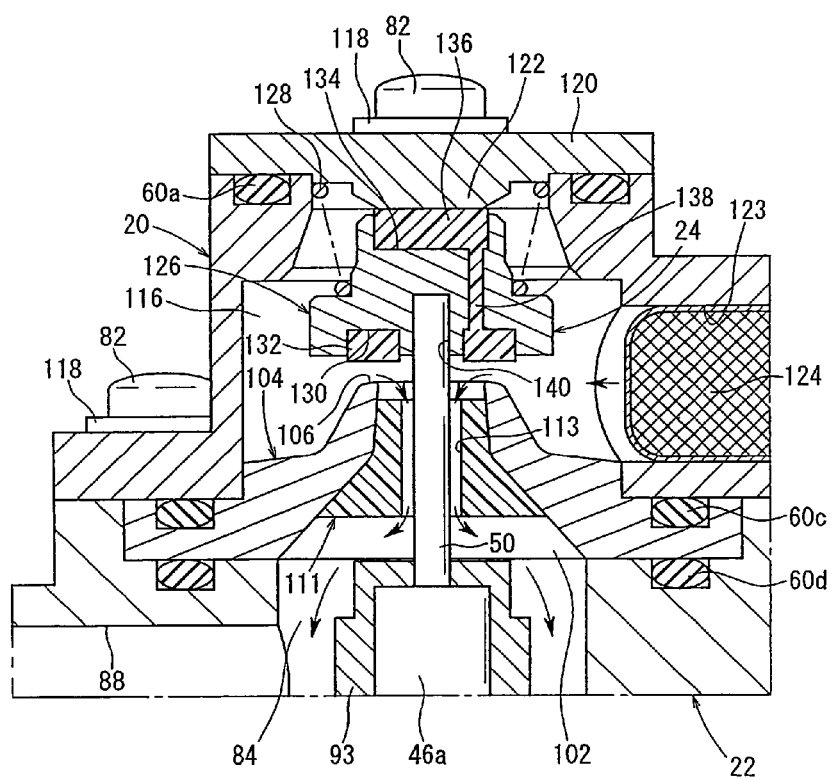
FIG. 9 is an enlarged vertical cross-sectional view showing a valve seat whose inner peripheral surfaces projects in a tapered fashion toward a shaft of the solenoid valve shown in FIG. 4.
Figure 10:
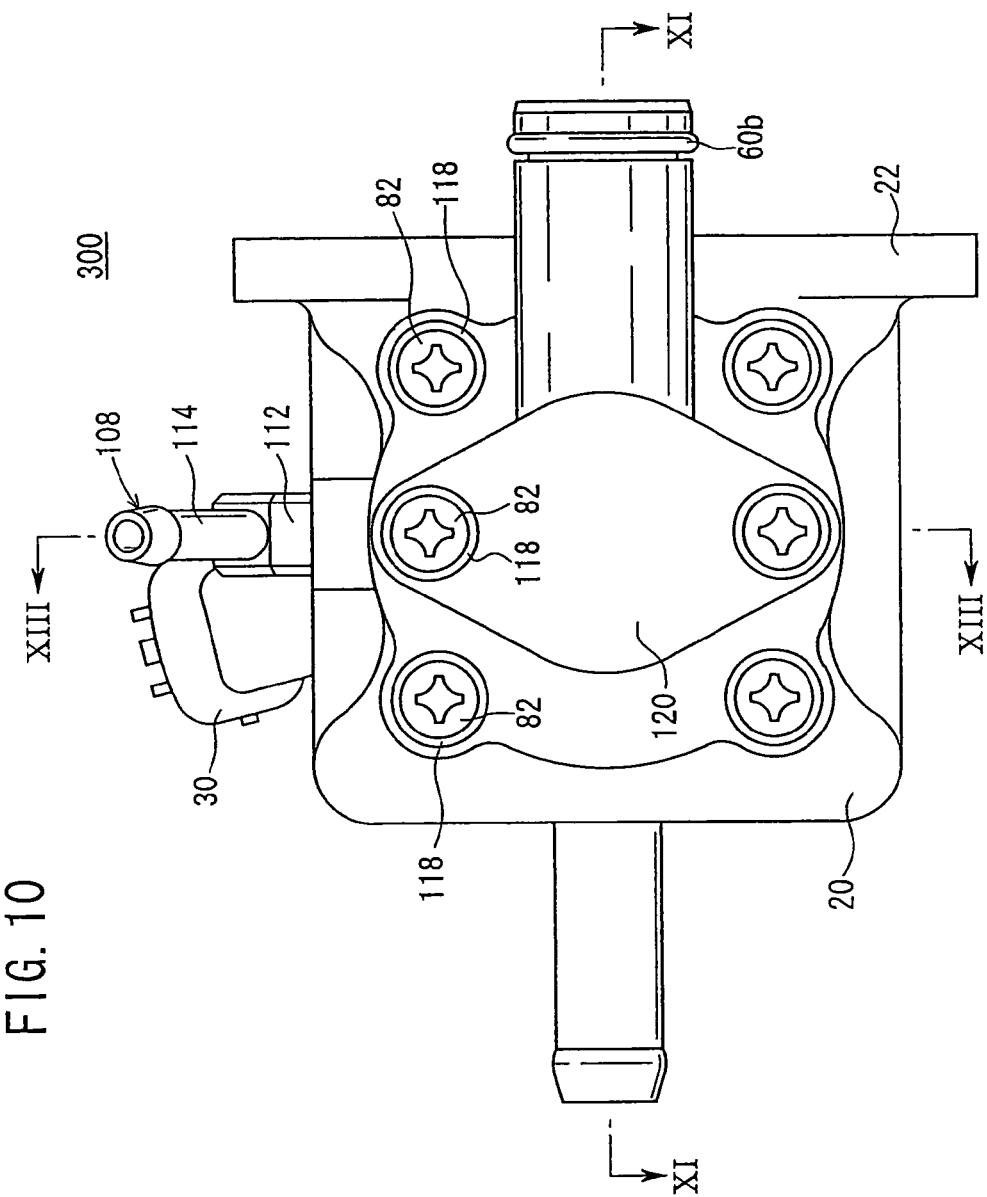
FIG. 10 is a plan view of a solenoid valve for fuel cells according to a second embodiment of the present invention.
Figure 11:
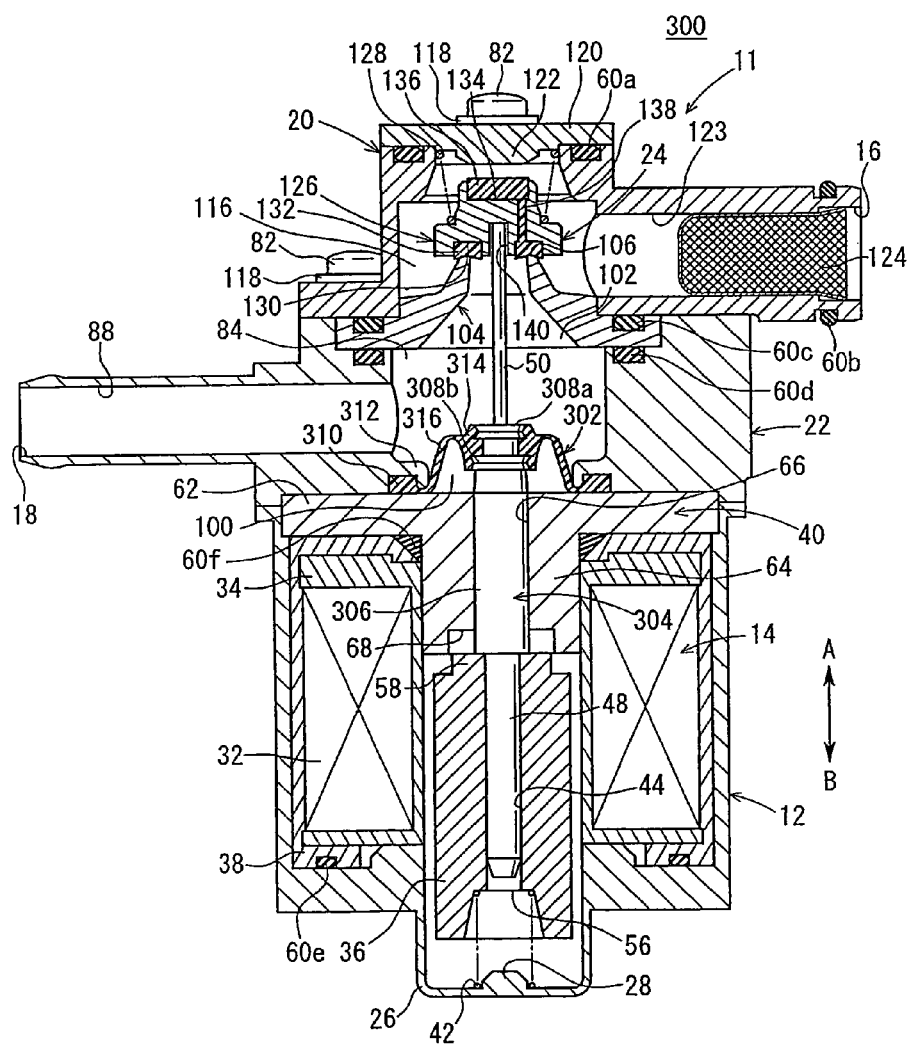
FIG. 11 is a vertical cross-sectional view taken alone line XI—XI of FIG. 10.
Figure 12:
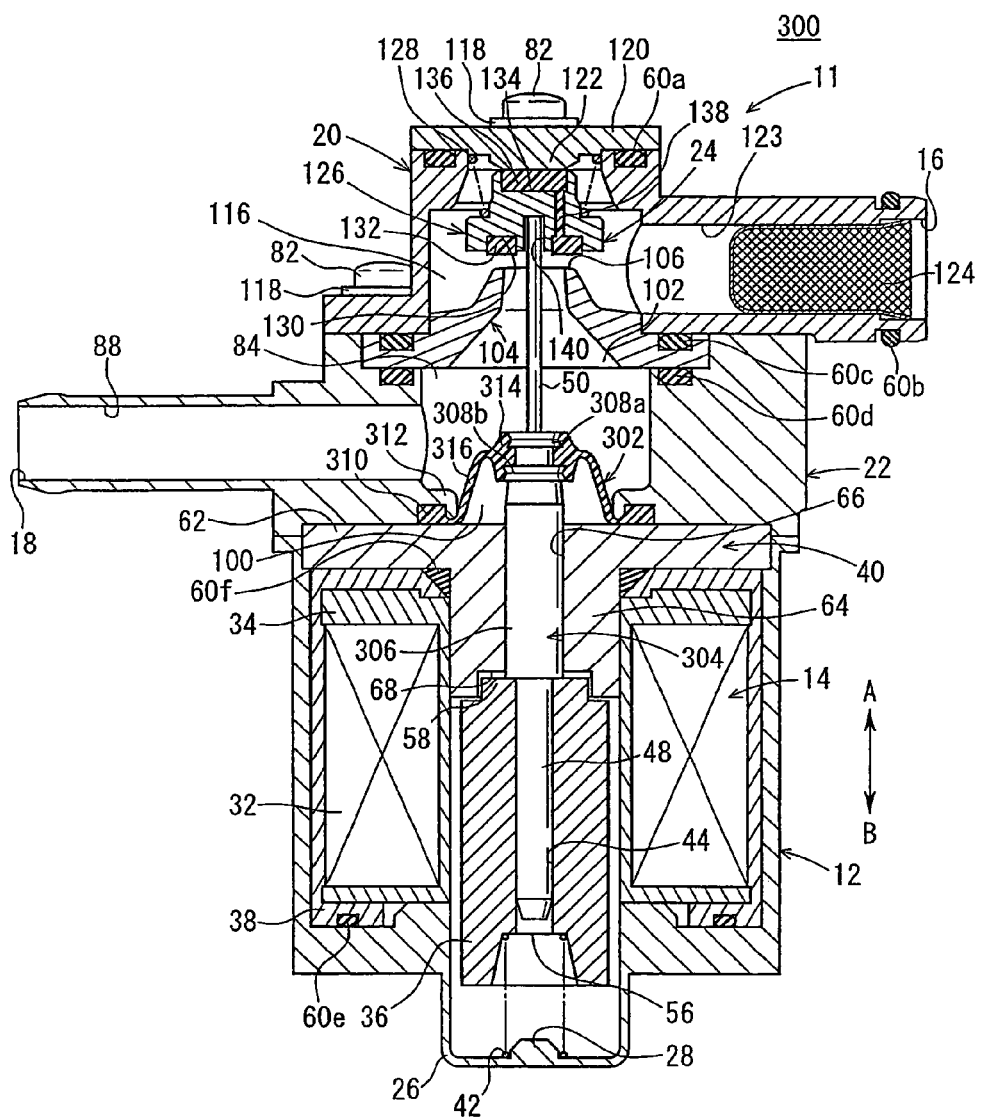
FIG. 12 is a vertical cross-sectional view of the solenoid valve shown in FIG. 11 when it is opened.
Figure 13:
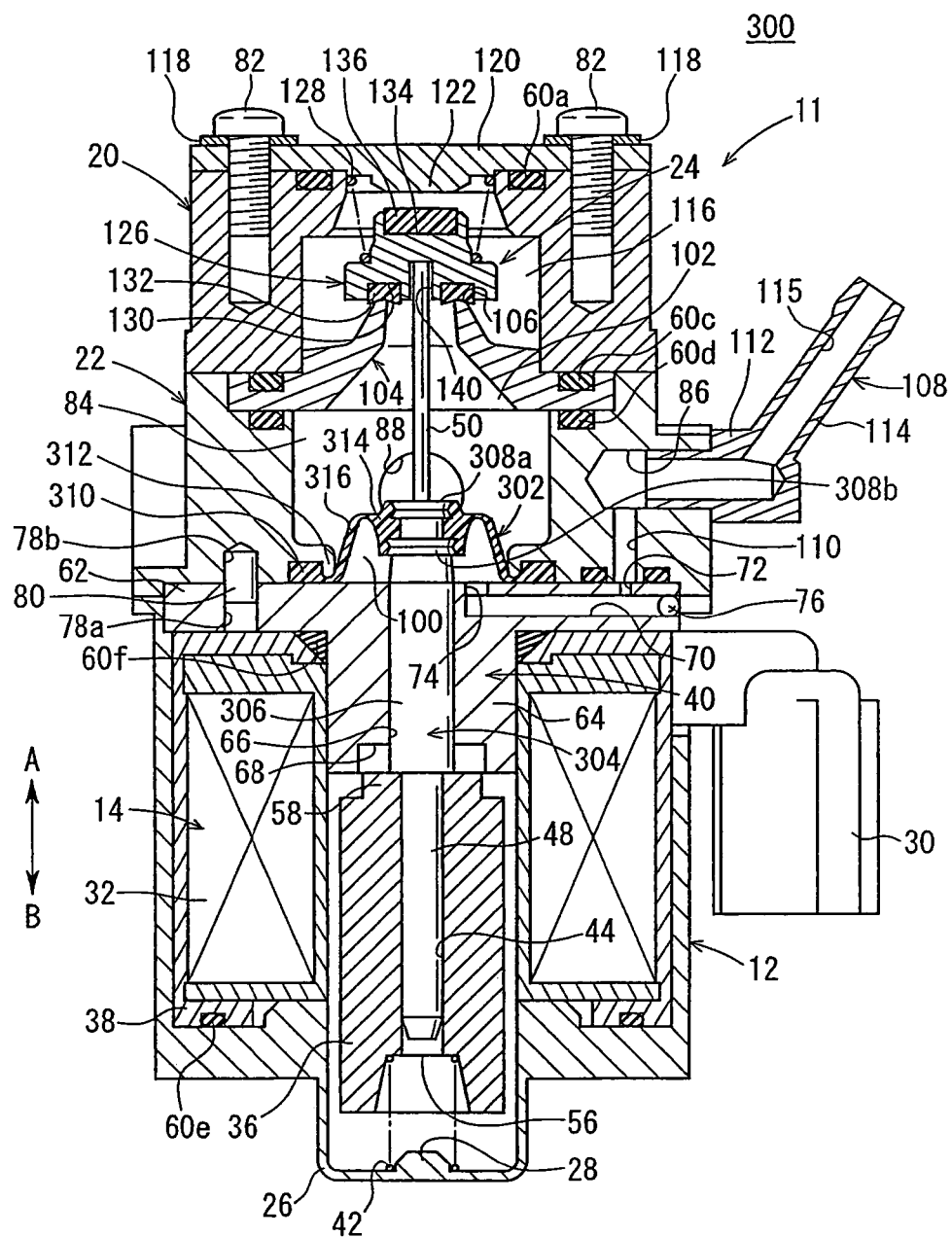
FIG. 13 is a vertical cross-sectional view taken alone line XIII—XIII of FIG. 10.

As shown in FIG. 9, furthermore, an adapter 111 made of a resin material, for example, may be fixed to an inner circumferential surface of the valve seat 104, instead of the restriction 127 (see FIG. 3). The adapter 111 is mounted in place along inner circumferential surface of the valve seat 104 and has an orifice 113 defined substantially centrally therein, with the second shank 50 of the shaft 46 extending through the orifice 113.

When hydrogen flows from the first port 16 (see FIG. 3) toward the second port 18, the flow rate of the hydrogen is limited by the orifice 113 of the adapter 111 disposed in the valve seat 104. Therefore, the load imposed on the diaphragm 92 disposed in the second communication chamber 84 can be reduced. Consequently, the orifice 113 of the adapter 111 disposed in the valve seat 104, rather than the restriction 127 (see FIG. 3) disposed in the first port 16, is capable of appropriately reducing the flow rate of the fluid under pressure (hydrogen) flowing through the second communication chamber 84, thus increasing the durability of the diaphragm 92.

If the adapter 111 is detachably mounted in the valve seat 104, then when the flow rate of hydrogen flowing from the first communication chamber 116 into the second communication chamber 84 is to be changed, another adapter 111 whose orifice 113 has a different inside diameter may be employed.

Consequently, when the flow rate of hydrogen flowing from the first communication chamber 116 into the second communication chamber 84 is to be changed to a desired flow rate, it is not necessary to replace the valve seat 104 in its entirety, but only the adapter 111 may be replaced. In this manner, the cost can be reduced.

The valve seat 104a (see FIG. 8) or the adapter 111 on the inner circumferential surface of the valve seat 107 may be combined with the restriction 127 in the first port 16.

The seating surface 106 for seating the valve head 126 thereon is located upwardly of the lower side of an inner circumferential surface of the first passage 123 in the first port 16.

Specifically, since hydrogen introduced from the fuel cell stack 202 (see FIG. 1) into the first communication chamber 116 contains water as it is humidified, such water tends to be trapped in the first communication chamber 116. The level of the water trapped in the first communication chamber 116 is substantially at the same height as the lower side of the inner circumferential surface of the first passage 123. Therefore, the water trapped in the first communication chamber 116 does not contact the valve head 126 that is seated on the seating surface 106.

Even if the water is frozen in the first communication chamber 116 at low temperatures such as in a cold climate, the valve head 126 and the seating surface 106 are not frozen by the water, so that the valve head 126 can reliably be displaced by the shaft 46 at low temperatures.

As shown in FIG. 5, a joint member 108 for connection to a tube (not shown) is mounted, from outside, in the air bleeder port 86 defined in the side surface of the second valve body 22.

The joint member 108 is made of a metallic material, and has a substantially horizontal connector 112 mounted in the air bleeder port 86 and an oblique branch 114 obliquely extending at a certain angle upwardly from the connector 112. The joint member 108 communicates with the air bleeder port 86 through a passage 115 that is defined in the joint member 108. The joint member 108 is vented to the atmosphere by a tube, not shown, that is connected to the oblique branch 114.

Inwardly of the air bleeder port 86, there are defined a first communication passage (fluid passage) 72 in the flange 62 substantially perpendicularly to the air bleeding port 86, and a third communication passage (fluid passage) 110 in a position facing the first communication passage 72. The third communication passage 110 is held in communication with the first communication passage 72.

The space 100 defined between the bent portion 96 of the diaphragm 92 and the upper surface of the flange 62 is held in communication with the interior of the joint member 108 through the second communication passage 74, the fluid passage 70, the first communication passage 72, and the third communication passage 110.

As shown in FIGS. 3 through 5, when a coil 32 of the solenoid unit 14 is supplied with a current, the coil 32 is energized and heated. As the coil 32 is heated, the fluid in the space 100 defined between the bent portion 96 of the diaphragm 92 and the upper surface of the flange 62 has its temperature increased and is expanded, increasing its volume. Since the space 100 communicates with the atmosphere through the second communication passage 74, the fluid passage 70, the first and third communication passages 72, 110, and the joint member 108, the fluid expanded in the space 100 is discharged out of the solenoid valve 10.

As a result, the diaphragm 92 and the shaft 46 are prevented from being displaced upwardly (in the direction indicated by the arrow A) under the pressure of the fluid which would be expanded in the space 100, and hence the valve head 126 is prevented from being unseated off the seating surface 106, so that the solenoid valve 10 is prevented from being opened.

The casing 12 on the lower portion of the solenoid valve 10 is formed of a metallic material into a substantially U-shaped cross section, and has a thin-walled cylindrical knob 26 disposed substantially centrally and projecting downwardly a predetermined length. The thin-walled cylindrical knob 26 has an inside diameter greater than the outside diameter of the movable core 36, to be described later. Specifically, the diameter of the thin-walled cylindrical knob 26 is selected to allow the movable core 36 to be displaced axially in the thin-walled cylindrical knob 26 when the movable core 36 is displaced upon energization of the solenoid unit 14.

Since only the thin-walled cylindrical knob 26 whose diameter is commensurate with the diameter of the movable core 36 that is axially displaceable projects downwardly from the casing 12, the overall structure may be smaller than if the casing 12 projects downwardly in its entirety.

An upwardly projecting spring guide 28 is disposed in the thin-walled cylindrical knob 26, and a first spring 42, to be described below, has an end engaging the spring guide 28.

Figure 2:
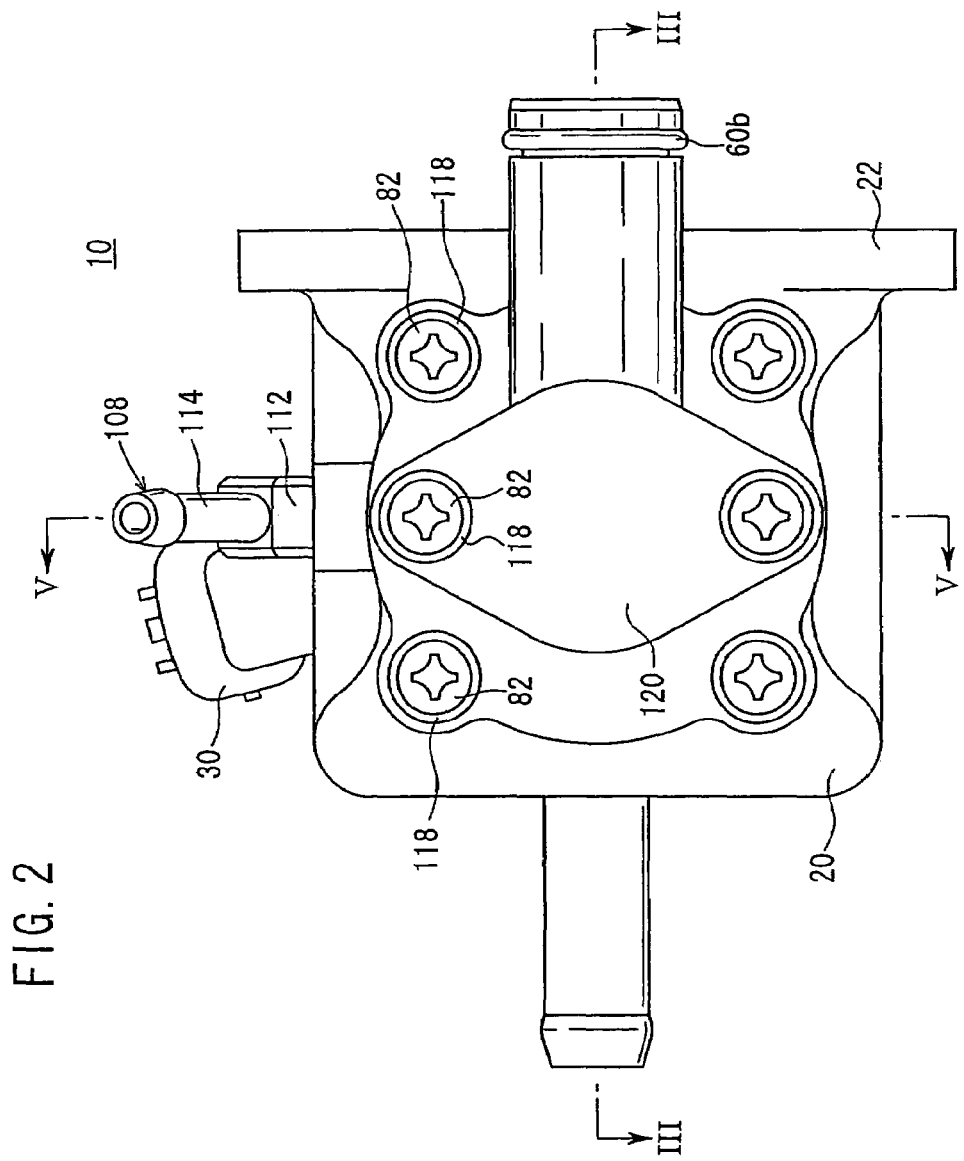
FIG. 2 is a plan view of the solenoid valve according to the first embodiment of the present invention.

A connector 30 (see FIGS. 2 and 5) for connection to leads (not shown) for supplying a current from a power supply, not shown, to the solenoid unit 14 is mounted on a side surface of the casing 12.

The solenoid unit 14 comprises a bobbin 34 disposed in the casing 12 and having a coil 32 wound therearound, the movable core 36 which is cylindrical that is displaceable axially upon energization of the coil 32, and a cover 38 surrounding the bobbin 34 with the coil 32 wound therearound. The solenoid unit 14 also has the shaft guide 40 disposed to close the upper end of the casing 12, and the first spring 42 interposed between the movable core 36 and the spring guide 28 of the casing 12 for normally urging the movable core 36 to move in a direction away from the thin-walled cylindrical knob 26.

The bobbin 34 has a lower surface placed in a lower portion of the casing 12, and has an inside diameter substantially equal to the inside diameter of the thin-walled cylindrical knob 26 of the casing 12.

The cylindrical movable core 36 which is made of a magnetic metallic material is axially slidably disposed in the bobbin 34. The movable core 36 has its outer circumferential surface spaced a predetermined distance from the inner circumferential surface of the bobbin 34. Therefore, when the movable core 36 is axially displaced, the outer circumferential surface of the movable core 36 is kept out of contact with the inner circumferential surface of the bobbin 34, so that the movable core 36 and the bobbin 34 are prevented from abrading each other.

The shaft 46 which is elongate has an end inserted in a through hole 44 that is axially defined substantially centrally in the movable core 36.

The shaft 46 has a first shank 48 on one end portion which is inserted in the movable core 36, and also has the second shank 50 on the other end which engages the valve head 126. The shaft 46 additionally has a third shank 52 disposed between the first shank 48 and the second shank 50 and inserted through the shaft guide 40. The enlarged end 46a with the step 54 is disposed between the third shank 52 and the second shank 50. The diameter of the shaft 46 is progressively greater in the sequence of the second shank 50, the first shank 48, and the third shank 52.

The through hole 44 in the movable core 36 has an inside diameter slightly greater than the diameter of the first shank 48 that is inserted in the through hole 44. For assembling the movable core 36 on the shaft 46, the through hole 44 in the movable core 36 is fitted over the first shank 48 until the upper end of the movable core 36 abuts against the lower surface of the third shank 52.

The outer circumferential surface of the shaft 46 has a fluorine coating thereon. Therefore, when the shaft 46 is displaced, it undergoes reduced resistance from the insertion hole 66 defined in the shaft guide 40 through which the third shank 52 slides. The shaft 46 and the shaft guide 40 thus suffers reduced wear and have increased durability. At the same time, worn-off particles that are produced when the shaft 46 slides in the insertion hole 66 are reduced.

The fluorine coating on the outer circumferential surface of the shaft 46 is capable of repelling water. Consequently, no water is attached to the outer circumferential surface of the shaft 46, which is thus prevented from developing rust and has increased durability.

The movable core 36 has a spring retainer hole 56 defined therein below the through hole 44 in a position confronting the spring guide 28 of the casing 12. The spring retainer hole 56 is of a tapered shape progressively spreading radially outwardly from the through hole 44 in the downward direction. The spring retainer hole 56 receives therein the other end of the first spring 42 that engages the spring guide 28 of the casing 12.

With the first spring 42 interposed between the spring retainer hole 56 and the spring guide 28, the movable core 36 is assembled in position such that its upper end is pressed against the lower surface of the third shank 52 of the shaft 46 under the resiliency of the first spring 42. The movable core 36 can therefore be assembled onto the shaft 46 with ease. The movable core 36 includes a land 58 disposed substantially centrally in its upper portion and projecting a predetermined distance.

The cover 38 which is disposed in the casing 12 is formed of a resin material into a substantially C-shaped cross section. The cover 38 has an upper portion sandwiched between an upper portion of the bobbin 34 and the flange 62 of the shaft guide 40 and a lower portion sandwiched between the casing 12 and a lower portion of the bobbin 34. The cover 38 has an outer circumferential wall sandwiched between the bobbin 34 and an inner circumferential surface of the casing 12. Therefore, the bobbin 34 with the core 32 wound therearound is surrounded by the cover 38.

A seal member 60e is mounted in an annular groove defined in a lower surface of the cover 38. The seal member 60e is held against the casing 21 to keep the interior of the casing 21 hermetically sealed. The interior of the casing 21 is also hermetically sealed by a seal member 60f that is interposed between an inner circumferential end of the upper portion of the cover 38 and the flange 62 of the shaft guide 40.

The shaft guide 40 is formed of a magnetic metallic material into a substantially T-shaped cross section, and has the flange 62 extending radially outwardly as an enlarged portion and sandwiched between the second valve body 22 and the solenoid unit 14. The shaft guide 40 includes a guide 64 positioned radially inwardly of, i.e., smaller in diameter than, the flange 62. The guide 64 is inserted in the bobbin 34.

The third shank 52 of the shaft 46 is displaceably guided in the insertion hole 66 that is axially defined substantially centrally in the guide 64. The clearance that is created between the outer circumferential surface of the third shank 52 and the inner circumferential surface of the insertion hole 66 is set to a small value (e.g., in a range from 10 to 50 μm, the shaft 46 being limited in operation in a range less than 10 μm) for more reliably allowing the shaft 46 to be axially displaced highly accurately.

With the above arrangement, the valve head 126 can be more reliably seated on the seating surface 106, and the seated position of the valve head 126 on the seating surface 106 can be stabilized. Thus, the re-seating capability of the valve head 126 at low temperatures is improved.

The guide 64 of the shaft guide 40 has a recess 68 defined therein at a position facing the land 58 of the movable core 36. The depth of the recess 68 in the axial direction is substantially the same as or slightly larger than the height of the land 58 in the axial direction. The diameter of the recess 68 is greater than the diameter of the land 58. Thus, when the movable core 36 is displaced upwardly, the land 58 is inserted into the recess 68.

As shown in FIG. 5, the fluid passage 70 is defined in the flange 62 of the shaft guide 40 and extends substantially horizontally in the radially inward direction from a side surface of the flange 62.

The first communication passage 72 is defined upwardly in an outer circumferential region of the flange 62 substantially perpendicularly to the fluid passage 70, and the second communication passage 74 is defined upwardly in an inner circumferential region of the flange 62 substantially perpendicularly to the fluid passage 70. The first and second communication passages 72, 74 are held in communication with the fluid passage 70.

A spherical closure plug 76 is press-fitted into the fluid passage 70 from the outer circumferential edge of the flange 62. The spherical closure plug 76 press-fitted in the fluid passage 70 has a diameter slightly greater than the diameter of the fluid passage 70. Therefore, the closure plug 76 keeps the fluid passage 70 out of communication with the outside of the solenoid valve 10, preventing the fluid from leaking via the fluid passage 70 from the side surface of the flange 62 into the outside of the solenoid valve 10. The closure plug 76 is press-fitted in a position radially outward of the first communication passage 72 in the flange 62.

The flange 62 has a hole 78a defined axially therethrough, and a cylindrical locking pin 80 is mounted in the hole 78a. The locking pin 80 mounted in the hole 78a has an upper portion inserted in a hole 78b that is defined in the lower surface of the first valve body 20, thus positioning the first valve body 20 with respect to the flange 62.

The valve mechanism 24 is disposed in the first communication chamber 116 in the second valve body 22, and comprises the valve head 126 which is displaceable in the axial direction of the shaft 46 and a second spring 128 interposed between an upper surface of the valve head 126 and the lid 120. The second spring 128 normally urges the valve head 126 to move in a direction away from the lid 120 (in the direction indicated by the arrow B), and is of a tapered shape which is progressively smaller in diameter from the lower surface of the lid 120 toward the valve head 126.

The valve head 126 has a first groove 130 defined at a position facing the seating surface 106 of the valve seat 104, the first groove 130 having a predetermined depth. A first elastic member 132 made of an elastic material and having an annular shape is mounted in the first groove 130. The elastic material of the first elastic member 132 keeps its elastic properties even at low temperatures (e.g., minus 20° C.).

When the valve head 126 is displaced downwardly (in the direction indicated by the arrow B) by the displacement of the shaft 46 and the first elastic member 132 is seated on the seating surface 106, the valve head 126 reliably seals the valve seat 104 because the first elastic member 132 made of an elastic material. Since the elastic function of the first elastic member 132 is not lowered at low temperatures such as in a cold climate, the valve head 126 can reliably seal the valve seat 104 at low temperatures.

The valve head 126 has a second groove 134 defined in an upper surface thereof at a position facing the stopper 122 of the lid 120, the second groove 134 having a predetermined depth. A second elastic member 136 made of an elastic material is mounted in the second groove 134.

When the valve head 126 is displaced upwardly (in the direction indicated by the arrow A) by the displacement of the shaft 46, the second elastic member 136 on the upper surface of the valve head 126 abuts against the stopper 122 and dampens shocks produced when the valve head 126 hits the stopper 122, thereby reducing impact noise that is generated when the valve head 126 hits the stopper 122. Stated otherwise, the second elastic member 136 has an absorber function to absorb shocks produced when the valve head 126 hits the stopper 122.

The first and second elastic members 132, 136 on the valve head 126 project slightly axially from the lower and upper surfaces, respectively, of the valve head 126. The first elastic member 132 that projects a predetermined distance from the lower surface of the valve head 126 is reliably seated on the seating surface 106 for thereby sealing the valve seat 104. The second elastic member 136 that projects a predetermined distance from the upper surface of the valve head 126 appropriately dampens shocks produced when the valve head 126 hits the stopper 122.

After the first elastic member 132 is formed so as to project a predetermined distance from the lower surface of the valve head 126, the first elastic member 132 may be subsequently machined, e.g., cut off, to provide a substantially flat abutment surface for being seated on the seating surface 106.

Specifically, regardless of the state of the abutment surface of the first elastic member 132 made of an elastic material, the abutment surface may be subsequently machined into a substantially flat surface which can more reliably seal the valve seat 104. Therefore, the abutment surface of the first elastic member 132 can reliably be seated on the seating surface, thereby reliably preventing hydrogen flowing through the first communication chamber 116 from leaking out.

Each of the abutment surface of the first elastic member 132 which is to abut against the seating surface 106 and the abutment surface of the second elastic member 136 which is to abut against the stopper 122 have a fluorine coating. The fluorine coating on each of the surfaces of the first and second elastic members 132, 136 that are made of an elastic material is effective to prevent the abutment surfaces of the first and second elastic members 132, 136 from sticking to the seating surface 106 and the stopper 122, respectively, when they abut against each other at the time the valve head 126 is displaced.

Since the fluorine coating on each of the first and second elastic members 132, 136 has a water repelling ability, water is prevented from being attached to the first and second elastic members 132, 136. Therefore, even when the solenoid valve 10 is used at low temperatures such as in a cold climate, water is prevented from being attached to and frozen on the first and second elastic members 132, 136, and the valve head 126 is allowed to move smoothly without being obstructed by frozen water.

The fluorine coating is not limited to the abutment surfaces of the first and second elastic members 132, 136, but may be applied to the entire surfaces of the first and second elastic members 132, 136, or the first and second elastic members 132, 136 may be made in their entirety of a fluorine-based rubber material.

The first groove 130 defined in the upper surface of the valve head 126 and the second groove 134 defined in the lower surface of the valve head 126 communicate with each other through a molding passage 138 defined axially in the valve head 126.

When the first and second elastic members 132, 136 are to be molded, either the first groove 130 or the second groove 134 may be filled with an elastic material, and the second groove 134 or the first groove 130 may also be filled with the elastic material through the molding passage 138. As a result, the first and second elastic members 132, 136 can integrally be molded through the molding passage 138. Therefore, the cost can be reduced, and the process of molding the first and second elastic members 132, 136 can be shortened.

In as much as the first and second elastic members 132, 136 are joined to each other by the elastic material that is filled in the molding passage 138, first and second elastic members 132, 136 are prevented from being dislodged from the first groove 130 and the second groove 134, respectively, by the joint between the first and second elastic members 132, 136.

The valve head 126 has an engaging hole 140 defined in the lower surface thereof, and the second shank 50 on the other end of the shaft 46 is inserted in the engaging hole 140. The engaging hole 140 has a diameter greater than the diameter of the second shank 50, so that the second shank 50 engages in the engaging hole 140 with a radial clearance between the outer circumferential surface of the second shank 50 and the inner circumferential surface of the engaging hole 140.

Since the second spring 128 is of a tapered shape progressively smaller in diameter from the lid 120 toward the valve head 126, the second spring 128 applies resilient forces in a combination of a direction to press the valve head 126 toward the upper portion of the shaft 46 (in the direction indicated by the arrow A) and a direction to press the valve head 126 radially inwardly.

Since the valve head 126 is pressed against the shaft 46 at all times via the engaging hole 140 and also pressed radially inwardly at all times under the resilient forces of the second spring 128, the upper portion of the shaft 46 is held in the engaging hole 140. Therefore, the upper portion of the shaft 46 that engages in the engaging hole 140 is not dislodged from the engaging hole 140.

As a result, even when the shaft 46 that is displaced when the solenoid unit 14 is energized is inclined to the axis of the solenoid valve 10 for some reasons, the valve head 126 can absorb the inclination of the shaft 46 due to the clearance defined between the engaging hole 140 and the shaft 46. Consequently, when the shaft 46 is inclined, the valve head 126 can reliably be seated on the seating surface 106 under the resilient forces of the second spring 128 without being affected by the inclination of the shaft 46.

Similarly, even when the valve head 126 is inclined to the axis of the solenoid valve 10 for some reasons, the inclination of the valve head 126 can be absorbed by the clearance defined between the engaging hole 140 and the shaft 46. Consequently, when the shaft 46 is axially displaced, it can smoothly be axially displaced without being affected by the inclination of the valve head 126.

The solenoid valve 10 according to the first embodiment of the present invention is basically constructed as described above. Now, operation and advantages of the solenoid valve 10 will be described below.

As shown in FIG. 1, in the fuel cell system 200, the first port 16 of the solenoid valve 10 is connected by a tube, not shown, to the hydrogen discharge port 218 (see FIG. 1) for discharging hydrogen from the fuel cell stack 202.

FIG. 3 shows the solenoid valve 10 when it is turned off (the solenoid valve 10 is closed) with the coil 32 de-energized, i.e., not supplied with a current from the connector 30 and the first elastic member 132 of the valve head 126 seated on the seating surface 106 to keep the first port 16 and the second port 18 out of communication with each other.

At the time the solenoid valve 10 is turned off, the power supply, not shown, is turned on to supply a current to the coil 32 to energize the coil 32, generating magnetic fluxes which flow from the coil 32 to the movable core 36 and then back to the coil 32.

As shown in FIG. 4, the movable core 36 is displaced axially upwardly (in the direction indicated by the arrow A), causing the shaft 46 inserted in the movable core 36 to move the valve head 126 away from the seating surface 106 against the resilient forces of the second spring 128.

When the valve head 126 is displaced upwardly (in the direction indicated by the arrow A) until the second resilient member 136 abuts against the stopper 122, the second resilient member 136 dampens shocks applied to the valve head 126, reducing shock noise that is produced when the valve head 126 hits the stopper 122.

As a result, the solenoid valve 10 switches from the turned-off state to a turned-on state (the solenoid valve 10 is open). Excessive hydrogen in the fuel cell stack 202 is discharged from the hydrogen discharge port 218 of the fuel cell stack 202, and is introduced via the non-illustrated tube through the first port 16 into the solenoid valve 10. The hydrogen introduced from the first port 16 is restricted to a predetermined flow rate by the orifice 125 of the restriction 127 and hence is depressurized, after which the hydrogen is delivered from the first communication chamber 116 through the valve seat 104 into the second communication chamber 84. Then, the hydrogen is discharged from the second port 18.

For seating the valve head 126 again on the seating surface 106 to keep the second port 18 and the first port 16 out of communication with each other, thus turning off the solenoid valve 10 from the turned-on state, the current supplied from the non-illustrated power supply to the coil 32 is cut off, de-energizing the coil 32, and the movable coil 36 is displaced downwardly. Substantially at the same time, the valve head 126 is pressed downwardly (in the direction indicated by the arrow B) under the resilient forces of the second spring 128. Under the resilient forces of the second spring 128, the valve head 126 is seated on the seating surface 106, bringing the second communication chamber 84 and the first communication chamber 116 out of communication with each other, and hence keeping the first port 16 and the second port 18 out of communication with each other.

According to the first embodiment, as described above, the seating surface 106 is positioned above the lower surface of the first port 16 in the first passage 123. Therefore, even when water contained in the hydrogen introduced from the first port 16 is trapped in the first communication chamber 116 and frozen at low temperatures, the valve head 126 and the seating surface 106 are prevented from being frozen. As a result, the valve head 126 is allowed to move smoothly, and can stably and reliably be seated on and unseated from the seating surface 106 at low temperatures.

In the first embodiment, the substantially central area of the diaphragm 92 which is sandwiched between the step 54 of the shaft 46 and the end of the press-fitted fixture 93 that is press-fitted over the shaft 46 is disposed above the lower surface of the second port 18 in the second passage 88.

Therefore, when water contained in the hydrogen introduced from the first port 16 is trapped in the second communication chamber 84 and frozen at low temperatures, the movable part of the diaphragm 92 is prevented from being frozen. As a result, the diaphragm 92 is allowed to move smoothly, and can be axially displaced by the displacement of the shaft 46 at low temperatures.

That is, even if water is trapped in the first and second communication chambers 116, 84 and frozen at low temperatures such as in a cold climate, the valve head 126 and the diaphragm 92 are allowed to move smoothly and hence can reliably be displaced. Therefore, hydrogen can reliably be discharged even at low temperatures.

In the first embodiment, the diaphragm 92 is disposed to isolate the second valve body 22 and the solenoid unit 14 from each other, so that when humidified hydrogen is introduced into the second communication chamber 84, water is prevented from entering the solenoid unit 14. Therefore, even at low temperatures, the shaft 46 and the movable core 36 are allowed to move smoothly and hence can smoothly and reliably be displaced. Furthermore, the shaft 46 and the movable core 36 which are made of a magnetic metallic material are prevented from developing rust due to water, and hence remain durable.

Dust particles such as worn-off particles are produced when the shaft 46 slides in the insertion hole 66 in the shaft guide 40 of the solenoid unit 14. Such dust particles are prevented by the diaphragm 92 from entering the second communication chamber 84.

Therefore, dust particles are prevented from being introduced from the second communication chamber 84 into the first communication chamber 116, from being attached to the seating surface 106, and hence from lowering the hermetic sealing capability of the valve head 126. Dust particles are also prevented from flowing through the second port 18 to a downstream region of the fuel cell system 200.

Thus, the diaphragm 92 made of an elastic material which is disposed to isolate the second valve body 22 and the solenoid unit 14 from each other is effective to prevent water from being introduced from the first and second communication chambers 116, 84 into the solenoid unit 14. The diaphragm 92 is also effective to prevent dust particles generated in the solenoid unit 14 from being introduced into the first and second communication chambers 116, 84.

In the first embodiment, the restriction 127 with the orifice 125 is disposed in the first port 16 upstream of the filter 124. The restriction 127 restricts the flow rate of the fluid under pressure which flows from the first port 16 toward the second port 18, thus depressurizing the fluid under pressure. Therefore, the load imposed on the diaphragm 92 in the second communication chamber 82 is lowered, preventing the diaphragm 92 from being deformed beyond an allowable range for increased durability thereof.

In the first embodiment, furthermore, the restriction 127 prevents excessive humidifying water from being introduced into the filter 124, which is thus made less susceptible to clogging.

In the first embodiment, the filter 124 is press-fitted in place until the enlarged end 124a thereof abuts against the first annular step 129a. The restriction 127 is also press-fitted in place until the end 127a thereof abuts against the second annular step 129b, so that the restriction 127 and the filter 124 are disposed coaxially in line with each other.

Consequently, inasmuch as the press-fitted regions of the filter 124 and the restriction 127 and the first and second annular steps 129a, 129b for engaging the filter 124 and the restriction 127 can be coaxially machined, they machinability is increased. As the directions in which the filter 124 and the restriction 127 are press-fitted are the same as each other, they can easily be assembled for better assembling efficiency.

In the first embodiment, furthermore, the diaphragm 92 is of an integral double-layer structure which comprises, for example, a high-strength base fabric covered with a thin elastomeric layer of nitrile rubber (NBR), and hence has high durability. As a result, the diaphragm 92 is highly durable because of its structure as well as the reduction in the pressure of the fluid by the restriction 127 having the orifice 125.

In the first embodiment, furthermore, the substantially central region of the shaft 46 is sandwiched between the step 54 on the shaft 46 and the end of the press-fitted fixture 93 that is press-fitted over the enlarged end 46a of the shaft 46, thereby providing a sealing function to keep the second communication chamber 84 hermetically sealed.

In the first embodiment, furthermore, the valve head 126 is disposed in the first valve body 20 coaxially with the solenoid unit 14. In this manner, dust particles contained in the reactant gas that is introduced through the valve head 126 into the second valve body 22 are prevented by the diaphragm 92 into the solenoid unit 14.

The valve head 126 is disposed upstream of the diaphragm 92 with respect to the flow of the reactant gas from the first port 16 to the second port 18, thus placing the diaphragm 92 under a pressure lower than the valve head 126. Therefore, the effect that the pressure has on the diaphragm 92 is reduced, allowing the solenoid unit 14 which causes the movable core 36 to displace the shaft 46 to be reduced in size.

In the first embodiment, furthermore, the orifice 125 defined in the restriction 127 is spaced a predetermined distance substantially horizontally from the seating surface 106.

Specifically, if the orifice 125 is too close to the seating surface 106 of the valve head 126, it produces an ejector action (attractive action), possibly failing to optimizing the restricting action of the orifice 125. Therefore, the orifice 125 defined in the restriction 127 and the seating surface 106 may be disposed in respective positions that are spaced a predetermined distance for not producing an ejector action.

The filter 124 is disposed between the restriction 127 and the seating surface 106 that are spaced a predetermined distance from each other. Therefore, the space between the restriction 127 and the seating surface 106 is effectively utilized for the solenoid valve 10 to have a smaller size.

In the first embodiment, furthermore, the first and second elastic members 132, 136 which are made of an elastic material are disposed respectively in the first and second grooves 130, 134 in the valve head 126. When the valve head 126 is displaced downwardly, the first elastic member 132 abuts against the seating surface 106, more reliably keeping the second communication chamber 84 and the first communication chamber 116 hermetically sealed from each other. When the valve head 126 is displaced upwardly into abutment against the stopper 122, the second elastic member 136 on the upper surface of the valve head 126 dampens shocks produced on the valve head 126 and reduces shock noise.

In the first embodiment, moreover, the first and second elastic members 132, 136 are integrally molded of an elastic material. Therefore, the process of manufacturing the first and second elastic members 132, 136 is shortened, and the cost thereof is reduced.

In the first embodiment, furthermore, the diaphragm 92 is disposed axially below the valve head 126. If dust particles are contained in the hydrogen that is introduced into the first and second communication chambers 116, 84, those dust particles fall downwardly by gravity. The dust particles fall downwardly are prevented by the diaphragm 92 from entering the solenoid unit 14.

In the first embodiment, furthermore, the clearance between the inner circumferential surface of the through hole 44 in the movable core 36 and the outer circumferential surface of the first shank 48 of the shaft 46 is reduced to reduce any inclination of the shaft 46 in the through hole 44 with respect to the axis thereof. Therefore, the shaft 46 can be displaced axially more reliably. As a consequence, the valve head 126 can be seated on the seating surface 106 more reliably in a more liable seated position.

In the first embodiment, furthermore, a clearance is created between the engaging hole 140 in the valve head 126 and the outer circumferential surface of the end of the third shank 52 of the shaft 46 which is inserted in the engaging hole 140. When the shaft 46 or the valve head 126 is inclined to the axis for some reasons, the clearance can absorb the inclination of the shaft 46 or the valve head 126.

When the shaft 46 is inclined, the valve head 126 can be seated on the seating surface 106 reliably under the spring forces of the second spring 128 without being affected by the inclination of the shaft 46. When the valve head 126 is inclined, the shaft 46 can be displaced smoothly along the axis without being affected by the inclination of the valve head 126.

The end of the movable core 36 and the confronting end face of the shaft guide 40 have complementary recess and land (see the land 58 and the recess 68), and the movable core 36 has a side gap on the other end thereof. With this arrangement, even if members which provide a magnetic path have certain variations, they can produce stable and large thrust forces.

In the first embodiment, furthermore, the casing 12 has the thin-walled cylindrical knob 26, and the other end of the movable core 36 is placed in the thin-walled cylindrical knob 26 when the movable core 36 is displaced. Therefore, magnetic fluxes are prevented from flowing to the thin-walled cylindrical knob 26, thus reducing thrust forces tending to move the movable core 36 away from the shaft guide 40.

Specifically, by employing a magnetic path arrangement for preventing magnetic fluxes from flowing to the thin-walled cylindrical knob 26, the solenoid unit 14 has output characteristics for producing thrust forces only when the solenoid valve 10 is to be opened, i.e., when large thrust forces are required, and thrust forces produced when the solenoid valve 10 is to be closed are reduced. Therefore, the solenoid unit 14 can be reduced in size.

A solenoid valve 300 for fuel cells according to a second embodiment of the present invention is shown in FIGS. 10 through 13. Those parts of the solenoid valve 300 according to the second embodiment which are identical to the solenoid valve 10 according to the first embodiment are denoted by identical reference characters, and will not be described in detail below. Operation of the solenoid valve 300 according to the second embodiment is identical to operation of the solenoid valve 10 according to the first embodiment, and will not be described in detail below.

The solenoid valve 300 according to the second embodiment differs from the solenoid valve 10 according to the first embodiment in that a diaphragm 302 for isolating the solenoid unit 14 from the first and second valve bodies 20, 22 is integrally mounted on a pair of mounts 308a, 308b on a third shank 306 of a shaft 304, and the diaphragm 302 has a peripheral edge 310 clamped between a retainer 312 of the second valve body 22 and the shaft guide 40.

The diaphragm 302 is made of an elastic material (e.g., rubber), and comprises a joint 314 disposed substantially centrally thereon and integrally mounted on the mounts 308a, 308b of the shaft 304, a thin-wall skirt 316 extending radially outwardly from the joint 314, and the peripheral edge 310 disposed on the outer circumferential end of the skirt 316.

The mounts 308a, 308b of the shaft 304 on which the joint 314 is mounted extend radially outwardly on the third shank 306 near the second shank 50. The mounts 308a, 308b are annularly formed along the circumferential surface of the third shank 306, and spaced a predetermined distance from each other in the axial direction of the shaft 304. The joint 314 of the diaphragm 302 is mounted on the mounts 308a, 308b in surrounding relation to outer circumferential surfaces thereof.

The retainer 312 projects radially inwardly from the inner circumferential surface of the second communication chamber 116, and has an annular groove in which the peripheral edge 310 is mounted. The peripheral edge 310 is sandwiched between the retainer 312 and the upper surface of the shaft guide 40. The diaphragm 302 keeps the second communication chamber 84 hermetically sealed.

The skirt 316 is formed of an elastic material into a thin-walled structure. The skirt 316 is flexible when the shaft 304 that is integrally coupled to the joint 312 is displaced.

With the above arrangement, the peripheral edge 310 of the diaphragm 302 is held by the retainer 312 which projects radially inwardly. The outside diameter of the diaphragm 302 is smaller than if it were not for the retainer 312. Accordingly, the diaphragm 302 may have a reduced pressure-bearing surface for bearing the pressure applied thereto, and the pressure applied to the diaphragm 302 may be small. Thus, the diaphragm 302 may have increased durability.

The joint 312 is cured with heat while its inner circumferential surface is engaging the mounts 308a, 308b of the shaft 304. However, the joint 312 of the diaphragm 302 may be integrally joined to the shaft 304 by other means than curing.

The diaphragm 302 is arranged such that when the valve head 126 is seated on the valve seat 104, the junction between the joint 314 and the skirt 316 of the diaphragm 302 is positioned axially upwardly of the lower side (closer to the solenoid unit 14) of the inner circumferential surface of the second port 18 in the second passage 88.

Since humidified hydrogen introduced from the fuel cell stack 202 (see FIG. 1) into the second communication chamber 84 contains water, water tends be trapped in the second communication chamber 84. The level of the water trapped in the second communication chamber 84 is substantially at the same height as, or lower than, the lower side of the inner circumferential surface of the second passage 88. Stated otherwise, the junction between the joint 314 and the skirt 316 of the diaphragm 302 is positioned so as not to be located in the trapped water.

Therefore, when the water is frozen in the second communication chamber 84 at low temperatures such as in a cold climate, the junction between the joint 314 and the skirt 316, which serves as a movable part of the diaphragm 302, is not frozen by the water. Consequently, the diaphragm 302 is reliably displaced when the shaft 304 is displaced at low temperatures.

Specifically, with the diaphragm 302 positioned so as to isolate the solenoid unit 14 from the first and second valve bodies 20, 22, dust particles that have entered the second communication chamber 84 are prevented from entering the solenoid unit 14. As a result, the shaft 304 is free of a smooth movement failure which would otherwise be caused by the introduction of dust particles between the shaft 304 and the insertion hole 66 in the shaft guide 40.

With the solenoid valves 10, 300 according to the first and second embodiments, excessive hydrogen discharged from the hydrogen discharger 216 is handled as the reactant gas. However, the reactant gas is not limited to such excessive hydrogen, but may be air discharged from the air discharger 208.

What is claimed is:

1. A solenoid valve for discharging a reactant gas from a fuel cell, comprising:
   a valve housing having a first port for introducing the reactant gas and a second port for discharging the reactant gas introduced from said first port;
   a solenoid unit disposed in a casing joined to said valve housing, said solenoid unit being energizable by a current;
   a shaft axially displaceable when said solenoid unit is energized;
   a valve head disposed in said valve housing and engaging an end of said shaft;
   a valve seat, said valve head being seatable on and unseatable from said valve seat when said shaft is displaced;
   a diaphragm attached to said shaft, said diaphragm being flexible in response to displacement of said shaft; and
   a restriction disposed in said first port and having an orifice for restricting a flow rate of the reactant gas introduced into the first port,
   wherein said first port has a passage defined therein in communication with a chamber in which said valve head is disposed, said passage housing a filter disposed therein, said restriction being disposed adjacent to said filter upstream thereof.

2. A solenoid valve according to claim 1, wherein said diaphragm comprises a base fabric covered with a thin elastomeric layer, said diaphragm having a substantially central area sandwiched between a step of said shaft and a press-fitted fixture press-fitted over an enlarged portion of said shaft.

3. A solenoid valve according to claim 1, wherein said valve head is disposed in said valve housing coaxially with said solenoid unit, said valve head being disposed upstream of said diaphragm with respect to a flow of said reactant gas from said first port to said second port.

4. A solenoid valve according to claim 3, wherein said solenoid unit has a fixed core disposed therein, and said fixed core and said diaphragm define a space therebetween, said space communicating with outside of said valve housing through a discharge passage for allowing a fluid in said space to be discharged outside of said valve housing.

5. A solenoid valve according to claim 4, wherein said discharge passage comprises:
   a fluid passage defined in said fixed core;
   a communication passage defined in said valve housing in communication with said fluid passage; and
   an air bleeder port communicating with said communication passage and outside of said valve housing.

6. A solenoid valve according to claim 4, wherein an outer circumferential surface of said shaft and an inner circumferential surface of said fixed core are spaced from each other by a distance ranging from 10 to 50 $\mu$m.

7. A solenoid valve according to claim 1, wherein said valve head has an engaging hole in which an end of said shaft engages, with a clearance defined between an outer circumferential surface of said shaft and an inner circumferential surface of said engaging hole, further comprising a spring for normally urging said valve head toward said shaft.

8. A solenoid valve according to claim 1, further comprising a first elastic member made of an elastic material mounted on an end face thereof which is to be seated on said valve seat, and a second elastic member made of an elastic material mounted on an opposite end face thereof which is axially remote from said end face.

9. A solenoid valve according to claim 1, wherein said valve seat has a restriction mechanism for restricting a flow rate of the reactant gas introduced from said first port.

10. A solenoid valve for discharging a reactant gas from a fuel cell, comprising:
    a valve housing having a first port for introducing the reactant gas and a second port for discharging the reactant gas introduced from said first port;
    a solenoid unit disposed in a casing joined to said valve housing, said solenoid unit being energizable by a current;
    a shaft axially displaceable when said solenoid unit is energized;
    a valve head disposed in said valve housing and engaging an end of said shaft;
    a valve seat, said valve head being seatable on and unseatable from said valve seat when said shaft is displaced;
    a diaphragm attached to said shaft, said diaphragm being flexible in response to displacement of said shaft; and
    a restriction disposed in said first port and having an orifice for restricting a flow rate of the reactant gas introduced into the first port,
    wherein said shaft has a surface coated with a fluororesin.

11. A solenoid valve for discharging a reactant gas from a fuel cell, said solenoid valve being incorporated in a fuel cell system having a fuel cell stack having an anode and a cathode, said solenoid valve comprising:
    a valve housing having a first port for introducing the reactant gas and a second port for discharging the reactant gas introduced from said first port;
    a solenoid unit disposed in a casing joined to said valve housing, said solenoid unit being energizable by a current;
    a shaft axially displaceable when said solenoid unit is energized;
    a valve head disposed in said valve housing and engaging an end of said shaft;
    a valve seat, said valve head being seatable on and unseatable from said valve seat when said shaft is displaced;
    a diaphragm attached to said shaft, said diaphragm being flexible in response to displacement of said shaft; and a restriction disposed in said first port and having an orifice for restricting a flow rate of the reactant gas introduced into the first port, wherein said solenoid valve is disposed in a hydrogen discharger which is connected to a circulation passage interconnecting an ejector for attracting the reactant gas discharged from the anode and the anode; and wherein said hydrogen discharger discharges an excessive reactant gas in said fuel cell stack out of the fuel cell system through said circulation passage.

12. A solenoid valve according to claim 11, wherein said fuel cell system is mounted on vehicles including automobiles.

13. A solenoid valve for discharging a reactant gas from a fuel cell, comprising:
   a valve housing having a first port for introducing the reactant gas and a second port for discharging the reactant gas introduced from said first port;
   a solenoid unit disposed in a casing joined to said valve housing, said solenoid unit being energizable by a current;
   a shaft axially displaceable when said solenoid unit is energized;
   a valve head disposed in said valve housing and engaging an end of said shaft;
   a valve seat, said valve head being seatable on and unseatable from said valve seat when said shaft is displaced;
   a flexible member disposed between said casing and said valve housing and attached to said shaft, said flexible member being flexible in response to displacement of said shaft and isolating said solenoid unit disposed in said casing from said valve housing to prevent the reactant gas from leaking into said solenoid unit; and
   a filter mounted in said first port for removing dust particles contained in said reactant gas.

14. A solenoid valve according to claim 14, wherein said flexible member comprises a diaphragm made of an elastic material, said diaphragm comprising:
   a joint integrally mounted on said shaft;
   a skirt extending radially outwardly from said joint; and
   a peripheral edge disposed on an outer circumferential end of said skirt and clamped between a fixed core disposed in said solenoid unit and said valve housing;
   the arrangement being such that when said valve head is seated on said valve seat, a junction between said shaft and said joint is positioned closer to said valve head than a lower side near said solenoid unit of an inner circumferential surface of said second port.

15. A solenoid valve according to claim 13, wherein said valve head is disposed in said valve head coaxially with said solenoid unit, said valve head being disposed upstream of said flexible member with respect to a flow of said reactant gas from said first port to said second port.

16. A solenoid valve according to claim 14, wherein said diaphragm has a peripheral edge held by a retainer projecting radially inwardly from said valve housing.

17. A solenoid valve for discharging a reactant gas from a fuel cell, said solenoid valve being incorporated in a fuel cell system having a fuel cell snack having an anode and a cathode, said solenoid valve comprising;
   a valve housing having a first port for introducing the reactant gas and a, second port for discharging the reactant gas introduced from said first port;
   a solenoid unit disposed in a casing joined to said valve housing, said solenoid unit being energizable by a current;
   a shaft axially displaceable when said solenoid unit is energized;
   a valve head disposed in said valve housing and engaging an end of said shaft;
   a valve seat, said valve head being seatable on and unseatable from said valve seat when said shaft is displaced; and
   a flexible member disposed between said casing and said valve housing and attached to said shaft, said flexible member being flexible in response to displacement of said shaft and isolating said solenoid unit disposed in said casing from said valve housing to prevent the react ant gas from leaking into said solenoid unit,
   wherein said solenoid valve is disposed in a hydrogen discharger which is connected to a circulation passage interconnecting an ejector for attracting the reactant gas discharged from the anode and the anode; and
   wherein said hydrogen discharger discharges an excessive reactant gas in said fuel cell stack out of the fuel cell system through said circulation passage.

18. A solenoid valve according to claim 17, wherein said fuel cell system is mounted on vehicles including automobiles.

* * * * *